United States Patent Office 3,320,059
Patented May 16, 1967

3,320,059
VOLTAGE-PRESSURE BONDING
Alex Labounsky, Wayanwi Ave., Bayville, N.Y. 11709
No Drawing. Filed Feb. 4, 1964, Ser. No. 342,548
15 Claims. (Cl. 75—214)

This invention relates to the production of materials in sheets, blocks or other massive form by compacting the components in a granular or finely divided form.

It is known, in the so-called "powder" metallurgy and in die-casting operations to produce large shapes, which may range from relatively simple forms as billets or cylinders to quite complex structures. In such procedures the metal, in the form of granules or powder, is placed in suitable molds and compressed at pressures ranging up to 100,000 pounds per square inch. Heating, whether as a resultant of the compressive forces or augmented from an external source, is kept below the melting point of the metal although temperatures of that order may occur locally and transitorily during the operation.

It is also known to effect bonding of articles of the same or dissimilar metals by the application of pressure coupled with other energy sources. Thus, in Jones et al. Patent No. 2,946,119, granted July 26, 1960, there is disclosed a method and apparatus for bonding metals employing high frequency vibratory energy and heat. In the Smith et al. Patent No. 2,095,295, issued October 12, 1937, metals are welded by the application of heat developed from electrical resistance of the parts while they are passing between the welding rolls. The pressure of the rolls, however, is relatively low and merely serves to keep the parts in good physical and electrical contact. Anderson et al. in Patent No. 3,006,067, issued October 31, 1961, describe a procedure for bonding metal leads to semi-conductors and the like, wherein the conductor element is substantially welded to the semiconductor by "thermo-compression." In the Anderson et al. technique, the temperature does not exceed several hundred degrees Centigrade, being kept well below the melting temperatures of the materials being bonded, either as such or as the eutectic.

In all of these prior operations, however, the pressures are relatively low. Even in the Anderson et al. method the pressures should not exceed that necessary to produce a deformation in the order of thirty percent. The behavior of materials under extremely high pressures, that is to say, pressures sufficient to cause material deformation in excess of fifty percent, however, is quite different and the phenomenon has been the subject of intensive study. Work of this character is described in several publications including: "International Symposium on High Temperature Technology," McGraw Hill Company, Inc., 1954; "International Symposium on High Temperature Technology," McGraw Hill Company, Inc., 1959; "High Pressure Methods," Dr. H. Tracy Hall, Rev. Sci. Inst., vol. 29, 1958; "Ultra High Pressure for Material Research," by Charles M. Schwartz and Wendell B. Wilson, Battelle Technical Review, vol. 8, No. 6, June 1959; "High Pressure," Dr. P. W. Bridgman, J. Appl. Phys. 12, 46 (1941), and J. Chem. Phys. 15, 92 (1947); and "Melting Point of Graphite at High Presure: Heat of Fusion," Dr. F. P. Bundy, Science vol. 137, 1962.

None of the aforesaid patents and publications, however, involve the simultaneous application of extremely high deformation pressures and extremely high electrical potential characterizing the instant invention as described more fully hereinafter.

It is an object of this invention to prepare alloys of preselected composition and uniform quality directly from the components simply and economically.

It is a further object to produce bonds between the same or dissimilar metals which are stronger than the materials themselves continuously and economically.

It is another object of the invention to prepare new compounds of preselected composition not obtainable heretofore.

These and other objects will become apparent from the following description and claims.

The new and novel feature of this invention basically is compacting material or materials by high pressure and forcing new electron configuration in the new resultant product by the passage of high velocity electrons through the material from the very high voltage source thus making new material or materials in which such chemical bonding of dissimilar materials was different of attainment.

Under the condition created by application of high pressure where the molecules and ions are forced closer together, the solid state diffusional processes coupled with bulk lattice transfer along boundaries of charged particles take place. The Coulombic attraction between ions is distorted when one ion deforms the electron cloud of the other ion. Such distortion results in polarization. As the anions are more polarizable than cations the degree of resultant activation energy would depend on the amount by which cations' positive fields are screened by anions or electrons. Just before this unstable polarizable condition at the interface or on the surface of ionized particles begins to be neutralized the application of high velocity electron stream from the very high source of voltage causes instant rearrangement of electronic configurations and thus stopping the normal processes of neutralization such as condensation, evaporation and diffusion from taking place in order to relieve unstable condition. The densification that results from application of high pressure in molecules is possible without the use of very high voltage but would require pressures in excess of a million atmospheres. Whereas high pressure in the order of up to one million kilobars coupled with very high voltage accomplishes the same results. As the mean free path of orbital electrons is constricted by high pressure and particularly by the high velocity electrons from high voltage source the shift of electrons to unfilled inner orbits takes place resulting in polymorphic conversion to denser crystalline structure with much smaller ionic radii.

Plausible theories in respect of atomic structure have been advanced by numerous workers in the field. By and large, most of them agree that such a structure is made up of positive ions—neutrons and protons surrounded by negative electrons arranged in a well defined, crystalline lattice pattern, be it a body-centered cube, face-centered cube, hexagonal, or other kind. The electrons in their spinning motion, as expressed by their momentum or wave number, being attracted by positive ions and repulsing each other, fall into a series of orbital shells or layers around the positive ions thus creating identifiable bands or energy states, known as Fermi surfaces. Quantum mechanics permit electrons to occupy the lower specific energy levels, as depicted in the exclusion principle, while the space between these filled zones constitute gaps or unoccupied space. These are known as interstitial voids or vacancies in the atom. This simplified illustration of the atomic structure should be corrected by the fact that the holes, or energy gaps, are not sharply delineated belts but partially diffused zones which, together with the principal crystal lattice pattern, account for specific characteristics of the material in question. The application of high pressure and high voltage utilizes these interstitial voids by partially filling them thus reshaping these energy levels further and in extreme cases densifying the materials.

By this new method it would be possible to densify elements with incompleted outer electron shells and shift the electrons from 4s to 3d orbitals, or 5s shell to 4d orbitals, or 6s to 5d, or elements of transition groups which have unfilled 3d or 4f electron shells.

In terms of thermodynamics the energy of a chemical reaction usually is expressed in calories—a heat unit. However, under the conditions of high pressure and heavy fluxes of high speed electrons as generated in this method very little energy is formed in the infrared region of spectrum that usually results in high temperature. Most of the energy put into the system is converted to do the useful work in densification of materials or forming molecular bonding within the materials, thus producing the new bonding under "cold" conditions.

If further electron kinetic energy could be expressed in terms of wave number, or a combined series of waves in a specified distance, then the electron energy would be a function of its velocity. On the basis of quantum mechanics any system will tend to stabilize itself at the lowest possible energy level and on the exclusion basis electrons, when energized, cannot increase their velocity to that of the electrons in the next high level and therefore must accelerate to velocities above those in the filled zones. This fact partially explains why imposed energy is not absorbed by the entire material and released in the form of heat, but accelerates the velocities of a few electrons which happen to be located in the immediate diffused (Brillouin) zones adjoining the orbital or occupied layers. The high velocity electrons capable of exceeding atomic or molecular bonding force are generated by high voltage transformers and condensers at potentials of at least 100,000 volts and ranging up to 10 million volts and by very high frequency generators with controls to adjust the frequency in harmonics corresponding to the specific prominent frequency of the material. Such generators should be designed to produce high frequencies up to and including the so-called "UHF" band. For other applications, however, the electromotive force may be applied as direct current. The conditions of vacuum for the application of this method are in the order of one atmosphere down to $10^{-9}$ mm. Hg.

The following description outlines the steps which are to be taken in application of the new method. The procedures given under each step are not necessarily limiting as described but cover variations in each step or omission of the with the exception of pressure and high speed electron flux applications.

A material whether an element or a composition is prepared having a desired fineness under vacuum or in an inert atmosphere and placed into an insulated container. The material is subjected to a high pressure by several known to art methods and a high voltage current is applied to the material. The material fineness in submicron sizes can be prepared by chemical solution or vapor condensation or powder metallurgical methods or by grinding. It could also be in solid form previously shaped for insertion into the carbide holder for pressure application. For ordinary materials where no specific requirements call for very high purity and controlled composition, there is no need for a vacuum and pressure with high voltage can be applied directly in the open. In such cases a hydraulic ram or a press or an explosive shock wave equipment can be used to build pressures to the desired deformation state of the material in question. For high purity materials or preparation of cermets or a resistant coating on another material an enclosure under vacuum would be used. The high voltage is applied in synchronism with explosive shock when the maximum pressure is built up. The duration of the high voltage application is usually in micro-seconds but can be extended depending on material used, the length to diameter ratio of container and the particular voltage used in each specific case. The higher the voltage applied the shorter the duration of application. It was originally thought that a cross sectional area of the material under treatment should be uniform throughout but it was discovered that instead of "channelizing" the current path there is spreading of electron flux throughout the material. This phenomenon could be partially explained on the basis that as each minute portion of the material receiving high speed electrons coupled with high pressure adjusts its electron configuration to the lower form of energy level or the neutrality thus offering a denser structure with fewer electron vacancies for conducting current at that particular portion of material. This then will force the electron flux to spread to yet unattacked portions of the material.

It is not clear how the electrons jump to vacancies in lower orbital shells under the effect of high pressure and high velocity electrons nor how the sharing of electrons changes between atoms or molecules resulting in a denser new crystalline structure. But they do and it may be due to a rigid confinement in a container under a steady high pressure. The energy imparted to such system by high speed electrons cannot escape in the form of radiant energy or sudden increases in temperature accompanied by enormous increases in pressure while the external pressure is maintained and thus may account for its conversion into a useful work of formation of new materials and compounds.

It should be understood, of course, that the foregoing is offered by way of explanation and not limitation. Regardless of theoretical consideration and whether or not the same may ultimately be proven or disproved, suffice it to say that when materials are subjected to high pressures and electrical potentials as herein disclosed, one obtains the new and useful products.

By this new method new compounds can be made by changing the electron configuration of the adjacent materials with diverse lattice structures so that the contact phases between the two or more become as strong as the rest and become an integral part of the two.

This method can be applied to a broad field of metal-ceramics for high temperature application. Many refractory metals such as Cb, Mo, Ti, Tc, Ta, Ru, W, Re, Os, Si and others such as B, Li and Be, could be chemically combined or coated with their own or other oxides or made as carbides, borides, nitrides, phosphides or as ternary systems with high melting point, strength, good heat transfer, and chemical inertness. Most refractory oxides such as beryllia, magnesia, lime, zirconia, or thoria can be effectively bonded with high temperature metals and alloys.

In accordance with procedures and techniques well known to those skilled in the art, the invention may be practiced on a batch, semicontinuous or continuous scale as desired.

The invention will be further exemplified by the following examples.

*Example One*

A series of transformers capable of delivering up to 115,000 volts in A.C. and D.C. current with Waite & Bartlett X-ray machine operating at 220 volts and 100 amperes have been used in all experiments. A variable split second timer was inserted in the circuit to regulate the duration of the charge. Powerstats were used in the primary circuits to adjust the voltage. Dual controls permitted the use of both A.C. and D.C. currents simultaneously. Direct current, however, was used in these experiments.

The assembly to hold the material for high pressure and high voltage application consisted of dense alumina cylinder which was placed into a case hardened steel sleeve. The top and bottom plungers of hardened drill steel were fit inside the ceramic cylinder which contained the material. Leading wires for high voltage were welded on to the side of steel plungers. Ceramic and mica plates were inserted into the assembly to insulate the plungers from the rest of the hydraulic press. Other ceramic shapes were used on the outside of assembly to prevent short-circuit of high voltage.

Commercial grade of iron powder of minus 200 mesh sizes was scrubbed clean with acid and washed with alcohol and thoroughly dried under vacuum. A 4% by weight of predried olivine powder minus 325 mesh was mixed with iron powder and compacted into the ceramic cylinder. Full pressure of hydraulic press was applied through a plunger after each small addition of the mixed powder until the ceramic cylinder was filled to 3 to 1 ratio of length of the material to its diameter.

The pressure developed by the hydraulic press is calculated to be about 100,000 atmospheres. After additional ceramic and mica plates have been inserted around and on the outside of plungers, the high voltage power just under 100,000 volts was applied 10 times at 1/120 of the second duration. At each power application the pressure was maintained. When the assembly was dismounted the ceramic cylinder was broken and the resultant monolithic bar showed the strength of iron and the gray cast.

Example Two

In this example same equipment was used as in the first example, except smaller inside diameter of plungers and the ceramic cylinder was used. Commercial grade magnesium metal was ground and screened through 100 mesh screen under argon gas cover. The finer fraction was thoroughly mixed with C.P. grade of magnesia, minus 325 mesh. The consistency of the mix was 3% magnesia to 97% magnesium metal. The rest of the experiment was same as before. Several runs were made with inconclusive results due to breakage of assembly or pinching of the plungers. The completed run showed the inner ceramic (alumina) fractured and powdery with pieces of magnesium metal adhering to it. The magnesium bar itself was silvery white and showed strength better than the same diameter magnesium metal without treatment.

It was established that a molecular bond can be made by the application of this method between metallic and non-metallic surfaces by adjusting the ratio of the two, the specific high voltage, duration of voltage application, high pressure and vacuum. The pressure refers to the extreme compactness of materials and the vacuum refers to the control of atmosphere in void spaces between the material particles. It is also significant that in application of this method to various mixtures of metals and/or nonmetallics the molecular bonding takes place without temperature rise to the point of melting the metals present.

Example Three

The same equipment was used in this example as in the previous two except that the press had a 4¾ inch diameter piston plunger at 10,000 pounds per square inch hydraulic pressure and a banke of condensers with a .25 mfd. capacity. The tungsten carbide plate assembly with mica sheets held the beryllium powder. The assembly was insulated from the press by heavy Bakelite plates and the electrical contacts to both sides of the assembly were made to the condensers through a crowbar type contact manual switch.

The beryllium powder used, which was estimated to contain at least 3% beryllium oxide, was minus 325 mesh commercial grade from Brush Beryllium Company. Several discs about 1/50 of an inch thick and about ½ inch to ¼ inch in diameter were made under various loading conditions, duration of pressure, and high voltage application. All the beryllium discs showed a gray metallic luster and the strength of beryllium metal. Those made under pressure but without high voltage application exhibited brittle beryllium characteristics in penetration and bending tests. Those made with the application of high voltage, particularly with full condenser charge, showed unusually high ductility for beryllium metal. They bent up to a 60° angle before breaking in the bending tests.

In the penetration tests the beryllium discs that were subjected to high pressure and high voltage showed a cone effect at the point of impact similar to that of a lead sheet.

Example Four

In this example the same equipment and conditions were employed as in Example Three.

Tungsten powder minus 325 mesh Kennametal grade MP-10 was used.

Tungsten discs were formed. The discs larger than ¼ inch in diameter showed characteristic metallic grayish luster and brittleness. The discs smaller than ¼ inch in diameter, particularly after pressure was applied up to two minutes and receiving several high voltage discharges, showed a silvery metallic luster and unusually high ductility in the bending tests. These tungsten discs remained solid after bending to a 45° angle. The penetration tests were less conclusive as the hardened steel needle invariably broke leaving a dent in the tungsten disc.

It should be understood, of course, that the foregoing disclosure relates only to preferred embodiments of the invention and that it is intended to cover all changes and modifications of the examples of the invention herein chosen for the purposes of the disclosure, which do not constitute departures from the spirit and scope of the invention.

What is claimed is:

1. The method for forming shaped bodies which comprises subjecting a confined mass of pulverulent inorganic material to a deformation pressure in excess of fifty percent and impressing thereon an electromotive force in excess of 100,000 volts without substantial change in temperature therefrom.

2. The method as set forth in claim 1 in which the pressure is at least 100,000 kilobars and up to one million kilobars.

3. The method as set forth in claim 1 in which the electromotive force is applied a plurality of times.

4. The method as set forth in claim 1 in which the electromotive force is a high frequency alternating current.

5. The process as set forth in claim 1 in which the body is shaped by extrusion while under the said deformation pressure.

6. The method as set forth in claim 1 in which the operation is conducted under sub-atmospheric pressure.

7. The method as set forth in claim 1 in which the operation is conducted in an atmosphere of inert gas.

8. The method for bonding two solid inorganic bodies comprising placing said bodies into contact along a predetermined zone, compressing said bodies on opposite sides of said zone so that the pressure is in the range 100,000– one million atmospheres, and, while the bodies are under said pressure, applying an electrical potential in the range 100,000 volts to 10 million volts across said zone without substantial change in temperature therefrom.

9. The method as set forth in claim 8 in which at least one of said bodies is metallic.

10. The method as set forth in claim 8 in which at least one of said bodies is nonmetallic.

11. The method as set forth in claim 8 in which one of said bodies is metallic and the other of said bodies is nonmetallic.

12. The method of producing composites comprising admixing at least two finely divided inorganic materials, compressing the resulting mixture at a pressure of at least 100,000 atmospheres and, during said compressing, subjecting said mixture to an electric potential of within the range 100,000 volts and up to 10 million volts without substantially change in temperature therefrom.

13. The process as set forth in claim 12 in which the process is conducted in an inert atmosphere.

14. The process as set forth in claim 12 in which at least one of the materials is a metal.

15. The process as set forth in claim 12 in which at least one of the materials is nonmetallic.

References Cited by the Examiner

UNITED STATES PATENTS

| | | | |
|---|---|---|---|
| 2,839,819 | 6/1958 | Platte | 75—225 |
| 3,011,043 | 11/1961 | Zeitlin | 219—149 |
| 3,162,530 | 12/1964 | Harrison | 75—225 |
| 3,241,956 | 3/1966 | Inoue | 75—200 |
| 3,250,892 | 5/1966 | Inoue | 75—200 |

FOREIGN PATENTS 686,714  5/1964  Canada.

CARL D. QUARFORTH, *Primary Examiner.*

BENJAMIN A. PADGETT, *Examiner.*

A. J. STEINER, *Assistant Examiner.*